PERSISTENT SWITCH MEANS FOR A SUPERCONDUCTING MAGNET

Original Filed May 21, 1964

INVENTORS
ROGER W. BOOM
LUTHER CARLTON SALTER, JR.
JAMES B. VETRANO
BY Gerald A. Koris
ATTORNEY 3,551,861
PERSISTENT SWITCH MEANS FOR A SUPERCONDUCTING MAGNET Roger W. Boom, Woodland Hills, Luther Carlton Salter, Jr., Los Angeles, and James B. Vetrano, Woodland Hills, Calif., assignors to North American Rockwell Corporation, a corporation of Delaware
Continuation of application Ser. No. 369,205, May 21, 1964. This application July 28, 1969, Ser. No. 847,814
Int. Cl. H01f 7/22
U.S. Cl. 335—216 16 Claims

ABSTRACT OF THE DISCLOSURE

A superconducting magnet incorporating a multi-strand conductor in solenoid configuration is operated within a cryogenic fluid. A superconducting persistence switch is provided whereby in its closed position current is trapped in the superconducting circuit of the magnet and switch.

This is a continuation of Ser. No. 369,205 filed May 21, 1964 and now abandoned.

The present invention relates to a superconducting multi-strand conductor, and more particularly to a multi-strand superconducting magnet which can carry larger currents than a single wire conductor of equivalent diameter.

Superconductivity is the property of certain materials at cryogenic temperatures approaching absolute zero to carry extremely large currents in strong magnetic fields without power dissipation. Such materials, at temperatures below a certain critical temperature, $T_c$, have no electrical resistivity, and therefore no $I^2R$ losses. This phenomenon has been experimentally verified. Coils of such materials in liquid helium baths, with currents induced by such means as withdrawing a permanent magnet from within the coil, have carried the resulting currents for periods of two years without any detectable voltage drop. The factors affecting superconductivity of such materials are the inter-relation of magnetic field strength H, critical current density $J_c$, and critical temperature $T_c$. The magnetic field strength, applied externally or generated by a current in the superconductor, limits superconductivity to below certain temperatures and current densities. Similarly, at a given field strength, an increase in temperature and/or current density can terminate superconductivity. The large current-carrying capacity of superconductors provides the basis for very compact, extremely powerful magnets which can be used in numerous applications where strong magnetic fields are required, for example, in lasers, masers, accelerators, and bubble chambers.

Since the field generated by a superconducting magnet is proportional to both the current carried by the superconducting wire and the number of turns of superconducting wire in the solenoid, it would appear that large diameter superconducting wire might be utilized. Large diameter superconducting wires might also find use in the transmission of large electrical loads between two points without power dissipation. It has been found, however, for reasons not thoroughly understood but perhaps involving both basic solid state physics of superconductivity and the metallurgy of superconducting wire fabrication, that the current-carrying capacity of superconducting wire is not directly proportional to the cross section area of the wire but is more nearly proportional to its diameter. For example, a 10-mil wire of a given composition may carry 50 amps, whereas a similar 30-mil wire will carry 150 amps. Superconductivity therefore seems to involve a surface conduction or bulk effect phenomenon. The fabrication of large diameter, large current-carrying superconducting magnets has, accordingly, been considered unfeasible and economically unattractive because of the high cost of the wire.

In order to obtain high-field superconducting magnets, resort has been had to the use of long lengths, running to the thousands of feet, of small diameter wires, for example 10 mils. The cost of manufacturing superconducting wire increases with the length of a given continuous section, due to difficulties in manufacturing very long lengths of the relatively brittle wire. However, joining a number of shorter sections in a continuous loop is not an entirely satisfactory alternative, because the joints between such section have a greater tendency to undergo superconducting/normal transitions, and unless the entire solenoid is superconducting, a persistent flow of current will not be maintained.

It is an object of the present invention, therefore, to provide a relatively large diameter superconducting wire capable of carrying large currents.

Another object of the present invention is to provide a multi-strand superconducting wire.

It is another object to provide a multi-strand superconducting magnet capable of carrying large persistent currents.

Another object is to provide a superconducting multi-strand conductor in a solenoid configuration which has little tendency to undergo superconducting/normal transitions, and which can rapidly recover from localized transitions without disturbing the overall superconducting condition of the solenoid.

Still another object is to provide means in such a conductor for heat conduction away from, and electrical transmission around, a point in which a superconducting/normal transition has occurred, thereby allowing rapid recovery of such point to a superconducting state.

A further object is to provide a relatively rapid and economical method of fabricating such a superconducting multi-strand conductor.

A still further object is to provide a high energy, low inductance magnet which can discharge its energy rapidly, for example, a millisecond energy source.

The above and other objects and advantages of the present invention will become apparent from the following detailed description and the appended drawings.

In the drawings, FIG. 1 is an overall perspective view of one embodiment of the present superconducting magnet;

Figures 1, 2, 3, 4, 5, 6:
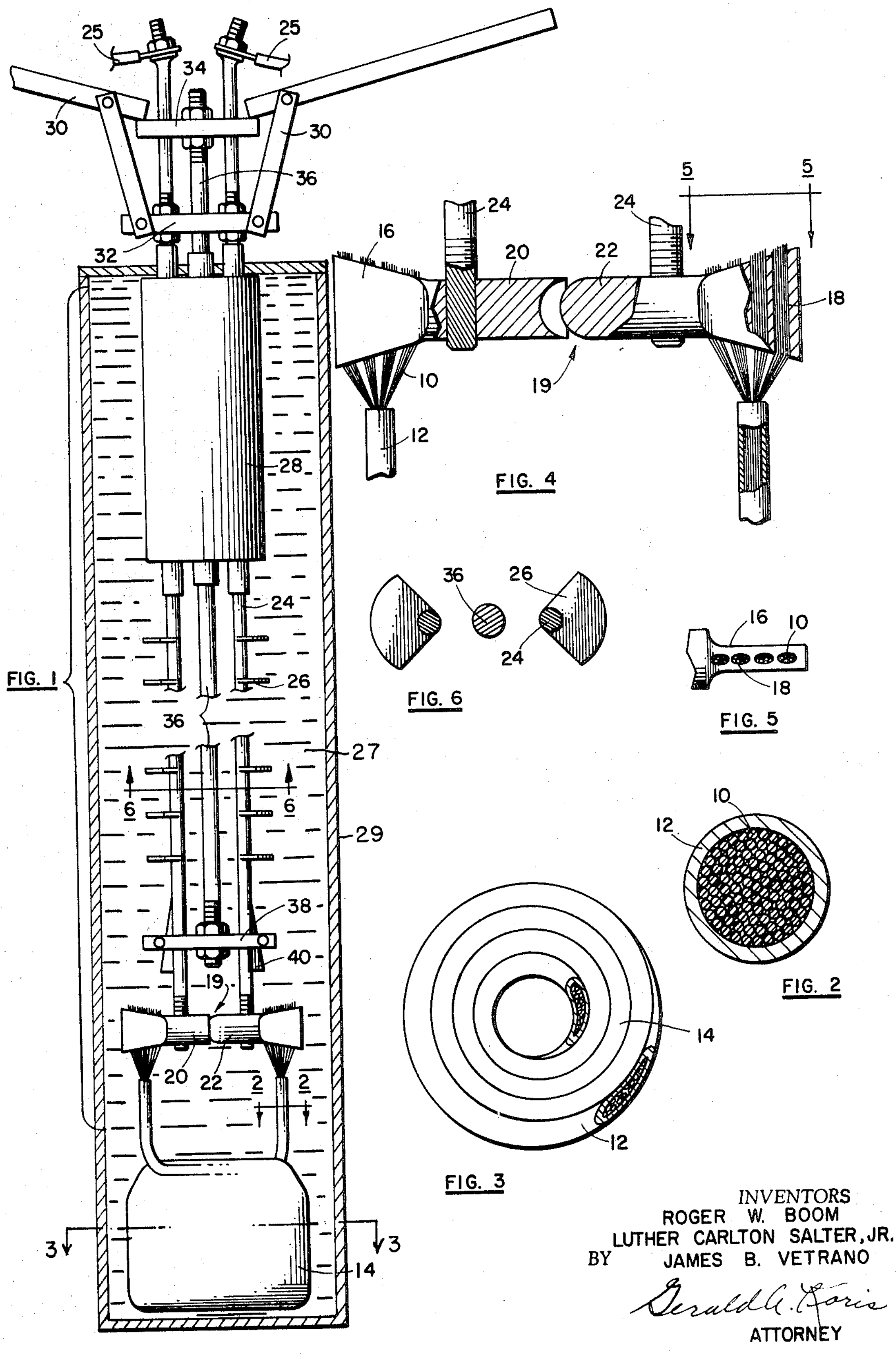
FIG. 2 is an enlarged section through the multistrand conductor showing the individual wires and enclosing sheath.
FIG. 3 is an enlarged section through 3—3 of FIG. 1 showing the superconducting solenoid.
FIG. 4 is an enlarged fragment, partly in section, illustrating the relationship between the termination of the superconducting wire assembly, the persistence switch, and the leads from the power source.
FIG. 5 is a plan view from 5—5 of FIG. 4 showing the termination of the superconducting wire assembly.
FIG. 6 is a section through 6—6 of FIG. 1 showing a cooling fin arrangement for the power leads to the superconducting solenoid.

It is found that the present superconducting multi-strand conductor will carry much greater currents than a single superconducting wire of equivalent diameter. In one experiment, for example, 2,000 amps were carried in the superconducting state, and the limitation was the power supply capacity. There were no proximity effects whereby the field of one wire affected another to degrade current. Further, the plurality of small diameter wires tends to diminish the frequency and extent of superconducting/normal transitions in the resulting conductor. It is believed that if one small wire is momentarily driven normal, the current jumps to the next small wire. Current conduction is thus not blocked, little energy is released, and fast recovery is achieved through cooling the wire back to a superconducting temperature. Such brief superconducting/normal transitions may be caused by flux jumps between the fine wires which induce eddy currents opposing current flow. As a result, superconducting/normal transitions occur on a microscopic rather than macroscopic scale, do not detrimentally affect overall operation of the magnet, and thus the magnet has less tendency to experience gross superconducting/normal transitions which terminate the flow of persistent current.

The bundle of superconducting wires may be arranged in various physical configurations to give the resulting large single conductor. A particularly advantageous arrangement is shown in FIG. 2, wherein a very large number of fine superconducting wires are assembled in a close-packed configuration. In this embodiment, a large number of fine superconducting wires 10, for example 10-mil Nb—Zr or Nb—Ti, each coated with a normal metal (i.e., nonsuperconducting) of low thermal and electrical resistance, are placed in a normal metal tube 12 of like properties, and reduced to a smaller diameter so that the resulting conductor is a tightly packed cylinder of mutually touching wires in a normal metal matrix. Such a packing technique insures a thermally and electrically continuous normal metal matrix of good thermal and electrical conductivity, and gives a more compact conductor and hence a greater volumetric magnetic field.

The matrix of normal metal jacketing and wire coating also serves a very important cooling function. Heat generated by a superconducting/normal transition as a result of the voltage induced by the collapsing magnetic field occasioned by such transition is rapidly conducted away, which then permits the wire to again reach the very low temperature (e.g., 9° K. for Nb—Zr) necessary for resumption of the superconducting state. While the normal metal chosen for coating the individual wires and the outer tube should be a good thermal and electrical conductor, electrical current is not drawn away from the superconducting wires since the small resistance of the normal metal is infinite in comparison with the zero resistance of the superconducting wires; it becomes an effective low resistance shunt when the superconductor is driven normal. Copper and silver are very satisfactory choices for the coating and tube metals.

The large cross section superconducting wire 10 consists, as seen in FIG. 2, of 86 wires of 10-mil Nb—25Zr, each copper electroplated, which are inserted into a ¼-inch copper tube 12 with 0.06-mil wall size. The tube is swaged to a diameter of 0.2 inch, which results in a cylinder of tightly packed Nb—Zr wires in a copper matrix. Twenty feet of conductor so formed are wound into a cylindrical magnet structure 14, 1″ ID x 2½″ long x 2½″ OD having 4 layers and 9 turns per layer (FIGS. 1 and 3). The strands 10 of the Nb—Zr conductor emerge from copper sheath 12 at the ends of solenoid 14 in order to make electrical contact with the incoming electrical current and the persistence switch. Multi-strand contact is made with superconducting member 16, of Nb or Nb—Zr, by pressing the wires in drilled holes 18 in joint 16. The wires are divided into four separate bundles, passed through holes 18 in member 16, as seen in FIGS. 4 and 5, and cold-pressed at about 40 tons.

The persistence switch 19 is made by the Nb—Zr wire connection through blocks 16. The blocks are machined and lathed, and pressed together to form two mating hemispherical surfaces 20 and 22 (FIG. 4). The switches are opened and closed mechanically, as described below, and in their closed position a persistent current is maintained in the solenoid structure 14 by effectively shorting out external current being supplied through the large diameter copper conductors 24 which terminate in the switch. (Closing switch 19, followed by shutting off the external power source, traps the current in the closed superconducting circuit of the magnet and persistence switch, since the resistance of copper conductor 24 to the external power source is infinite in comparison with that of the superconducting persistence switch.)

The copper rods 24 which connect the superconducting magnet with the power source at leads 25 have a plurality of copper cooling fins 26 (FIGS. 1 and 6) and pass through a chamber 28 which contains liquid nitrogen. The cooling means dissipates heat generated in conductor 24 by the passage of very large current, e.g., 2,000 amps, and prevents distortion of the conductors and boiling of the liquid helium bath 27 which is disposed in container 29, in which the entire structure, from solenoid 14 to the top of nitrogen chamber 28, is inserted for superconducting operation. A pair of hinged arm linkages 30 are provided for opening and closing the persistence switch; they pivotally connect to cross bar 32 and engage cross bar 34. Bringing the arms 30 together in a closing operation depresses bar 34 onto which a rod 36 is attached. Rod 36 extends along the axis of the magnet structure and at its other end engages a cross bar 38 which rides on the inclined surfaces or cams 40. The movement of bar 38 along the cam surfaces draws the conducting rods 24 closer together and hence brings mating surfaces 20 and 22 into engagement. It is apparent that equivalent switches and means of operating such switches may be made by those skilled in the art.

A magnet of the above design has carried 1,600 amps, in a persistent manner, and has generated a magnetic field of 8 kilogauss. In comparison a superconducting magnet of the same dimensions and materials, but being composed of a single large superconducting wire of the same diameter, would carry about 400 amps and produce a field of only 2 kilogauss. The magnet had an inductance of 60 microhenries which allows for rapid discharge, depending on the load, and permits the magnet to be used for purposes where a capacitor bank would be used for storage and rapid discharge.

While the present invention has been described with respect to a particular embodiment, it should be understood that variations may be made by those skilled in the are within the scope of the invention, and that the description is illustrative rather than restrictive of the invention. The present invention should be understood to be limited, therefore, only as is indicated in the appended claims.

We claim:

1. A superconducting magnet comprising:

(a) first container means enclosing a cryogenic fluid, (b) second container means positioned within said first container means enclosing a cryogenic fluid, (c) solenoid means wound from a superconducting conductor and positioned within said first container means, (d) persistence switch means having first and second switch positions electrically connected to said solenoid means, (e) electrical power conductor means positioned through said first and second container means and selectively connected electrically to said solenoid means through said persistence switch means, and (f) switch actuator means operatively connected mechanically to said switch means moving said switch means between said first and second switch positions so that in said first switch position said conductor means is electrically connected to said solenoid means and in said second switch position said conductor means is electrically shunted from said solenoid means thereby trapping electrical current in the solenoid means and persistence switch means so that a magnetic field is generated by the superconducting magnet.

2. The superconducting magnet of claim 1 in which said first container means encloses a first cryogenic fluid and said second container means encloses a second cryogenic fluid.

3. The superconducting magnet of claim 2 in which said first cryogenic fluid is liquid helium and said second cryogenic fluid is liquid nitrogen.

4. The superconducting magnet of claim 1 in which said solenoid means is wound from a superconducting conductor having a plurality of superconductive wire strands solidly embedded in a continuous normal metal matrix, each wire strand being individually normal metal coated, said normal metal being of a high thermal and electrical conductivity.

5. The superconducting magnet of claim 4 in which said normal metal is copper and said superconductive wire strands consist of niobium and 20–40 atomic percent zirconium.

6. The superconducting magnet of claim 1 in which said persistence switch means comprises:

(a) first and second switch members adapted for mechanical movement between said first and second switch positions by said switch actuator means, (b) a generally concave hemispherical surface formed in said first switch member, and (c) a generally convex hemispherical surface formed in said second switch member, said concave and convex surfaces being maintained in a spaced apart relationship in said first switch position and in a mating engagement in said second switch position by said switch actuator means.

7. The superconducting magnet of claim 6 in which said solenoid means is wound from a superconducting conductor having first and second conductor ends and further having a plurality of superconductive wire strands extending from said first and second conductor ends, said wire strands developing a plurality of wire strand bundles at said first and second conductor ends, and respective ones of said first and second conductor end wire strand bundles mechanically connected to associated ones of said first and second switch members in a spaced apart bundle arrangement.

8. The superconducting magnet of claim 7 in which each of said wire strand bundles is mechanically clamped in a respective one of a series of spaced-apart holes formed in each of said first and second switch members.

9. The superconducting magnet of claim 8 in which said first and second switch members are cold-pressed to mechanically clamp said wire bundles.

10. The superconducting magnet of claim 6 in which said electrical power conductor means includes first and second conductor members connected to respective ones of said first and second switch members.

11. The superconducting magnet of claim 10 in which said first and second conductor members have a plurality of spaced-apart heat radiating fins connected thereto in said first container means.

12. The superconducting magnet of claim 10 in which said switch actuator means comprises:

(a) displacement means engaging said first and second conductor members and adapted for movement between first and second actuator positions, and (b) force generating means positioned external to said first container means and connected to said displacement means moving said displacement means between said first and second actuator positions.

13. The superconducting magnet of claim 12 in which said displacement means comprises:

(a) cam surface means carried by said first and second conductor members, (b) cam follower means adapted to slidably engage said cam surface means, and (c) actuator means positioned through said first and second container means and connected between said force generating means and said cam follower means so that displacement of said actuator means by said force generating means displaces said cam follower means along said cam surface means thereby moving said first and second switch members between said first and second switch positions.

14. The superconducting magnet of claim 13 in which said force generating means is a hinged arm linkage means adapted to impinge upon said actuator means and selectively displace said actuator means between said first and second switch positions.

15. The superconducting magnet of claim 14 in which said first and second switch members are in said first spaced-apart position when said cam follower means is not acting upon said cam surface means and wherein said first and second switch members are forced into said second mating switch position by the action of said cam following means on said cam surface.

16. The superconducting magnet of claim 15 in which said actuator means is an actuator rod extending between and generally parallel with adjacent ones of said first and second conductor members, said actuator rod and said first and second conductor members developing a plane in which said displacement of said first and second conductor members occurs toward and away from said actuator rod.

References Cited

UNITED STATES PATENTS

| | | | |
|---|---|---|---|
| 3,109,963 | 11/1963 | Geballe | 335—216X |
| 3,187,235 | 6/1965 | Berlincourt et al. | 335—216 |
| 3,210,610 | 10/1965 | Fraser | 335—216X |
| 3,366,728 | 1/1968 | Garwin et al. | 335—216X |

GEORGE HARRIS, Primary Examiner

U.S. Cl. X.R.

200—166